United States Patent

[11] 3,625,970

[72] Inventor Laszlo Ambrus
  Oakland, Calif.
[21] Appl. No. 721,918
[22] Filed Apr. 17, 1968
[45] Patented Dec. 7, 1971
[73] Assignee Cutter Laboratories, Inc.
  Berkeley, Calif.

[54] 1-(DISUBSTITUTED PHENYL OR BENZYL)-1H-INDAZOL-3-YLOXYACETIC ACID
6 Claims, No Drawings

[52] U.S. Cl. .................................................... 260/310 C,
  260/349, 260/544 C, 260/562 R, 260/562 P,
  260/576, 260/618 D, 260/651 R, 424/273
[51] Int. Cl. ........................................................ C07d 49/02
[50] Field of Search .......................................... 260/310 B

[56] References Cited
UNITED STATES PATENTS
3,470,194 9/1969 Palazzo ........................ 260/310 B FOREIGN PATENTS
1,054,833 1/1967 Great Britain ................ 260/310 B
1,088,973 10/1967 Great Britain ................ 260/310 B OTHER REFERENCES
Noller Chemistry of Organic Compounds 2nd ed. Page 170 Philadelphia, Saunders, 1958, QD 253.N65

Primary Examiner—Natalie Trousof
Attorneys—Bertram Bradley and Dean Laurence

ABSTRACT: Chemical compounds in which the hydroxyl hydrogen atom of a 1-(disubstituted phenyl or benzyl)-1H-indazol-3-ol is replaced by a carboxymethyl moiety to yield 1-(disubstituted phenyl or benzyl)-1H-indazol-3-yloxyacetic acids are described.

The compounds can be prepared by forming the alkali metal salt of the indazol-3-ol and effecting a Williamson Ether Synthesis reaction with a carboxymethyl halide.

The compounds possess anti-inflammatory activity as demonstrated by the Limb Volume Test procedure.

1-(DISUBSTITUTED PHENYL OR BENZYL)-1H-INDAZOL-3-YLOXYACETIC ACID

This invention relates to compositions of matter classified in the art of chemistry, as 1-(disubstituted phenyl or benzyl)-1H-indozoloxy aliphatic acids.

The invention sought to be patented, resides in the concept of a composition of matter having a molecular structure in which the 1-(di-substituted phenyl or benzyl)indazole nucleus has at its 3-position a carboxymethyl group attached through an ether linkage; and, in processes for making the same.

The tangible embodiments of the composition aspect of the invention possess the inherent general physical properties of being crystalline solids and possess the inherent applied use characteristic of exhibiting pharmacological anti-inflammatory activity. An additional utility of these compounds is their inherent ability to fluoresce on exposure to ultraviolet radiation. This property of the said composition aspect renders them useful as optical brighteners, e.g., in detergent formulations.

The carboxylic portion of the carboxymethyl group can be a free acid or in the form of salts, preferably water-soluble metal salts, especially the alkali-metal salts.

The 1-phenyl or 1-benzyl group is disubstituted and bears at least one trifluoromethyl group.

The two substituents are attached to the 1-phenyl or 1-benzyl group and may be in the 2,3; 2,4; 2,5; 2,6; 3,4; or 3,5 positions of the phenyl group. Compounds in which at least one of the substituents are in the meta or 3-position are preferred because of the greater pharmacological activity of the resulting compounds. The substituents may be identical, e.g., 3,5-trifluoromethylphenyl radical; or mixed, e.g., 2-chloro-5-trifluoro-methylphenyl radical.

The alpha-carbon atom of the carboxymethyl portion of this invention can bear substituents, e.g., carboxy, carb-lower-alkoxy including carbomethoxy, carbethoxy, carbopropoxy and carbobutoxy; lower alkyl including methyl, ethyl, propyl and butyl; lower alkoxy including methoxy, ethoxy and propoxy. Of these substituents, the methyl, ethyl, carboxy, and carb-lower alkoxy are preferred.

The 1-(disubstituted phenyl or benzyl) portion of these compounds bears a trifluoromethyl group, preferably at the 3-position of the phenyl or benzyl ring. The other substituent or substituents on the 1-phenyl or 1-benzyl ring include, for purposes of illustration, trifluoromethyl; halogen including fluoro and chloro; lower alkyl including methyl, ethyl and propyl. Of these, the trifluoromethyl, chloro and methyl groups are preferred.

While the invention has been illustrated with a trifluoromethyl group in 3-position of the 1-phenyl or 1-benzyl ring it will be apparent to those skilled in the art, from the description herein given as to the compounds having a trifluoromethyl group in the 3-position, appropriate selection of starting materials in which the trifluormethyl group is in the 2-, 4-, or 5-position and a substituent of the type hereinbefore enumerated is also present on the ring will enable production of 2,5 and 3,4 disubstituted compounds within the scope of the invention having the same applied use characteristics as the 3-position compounds herein specifically described.

The 4-, 5-, 6- and 7-positions of the indazole ring of the compounds of this invention can also optionally bear substituents among which are, for example, trifluoromethyl; halogen, including fluoro and chloro; lower alkyl, including methyl, ethyl, and propyl; acetamido; nitro; and, lower alkoxy, including methoxy, ethoxy, propoxy and butoxy. The preferred compounds, however, are unsubstituted in the benzenoid portion.

The manner of making and using the invention will now be generally described so as to enable a person skilled in the art to make and use the same.

The compounds of this invention are prepared by the etherification of the hydroxy group of a 1-phenylindazol-3-ol with an acyloxy etherifying agent to produce an alpha-acetoxy ether thereof.

Carboxymethyl ethers of 1-(disubstituted phenyl or benzyl)-1H-indazol-3-ol can be prepared using the Williamson Ether Synthesis whereby the alkali metal salt of the 1-(disubstitued phenyl or benzyl) 1H-indazol-3-ol is brought in contact with a carboxymethyl halide, the reaction being carried out in a solvent inert to the reactants.

The 1-disubstituted-phenyl-1H-indazol-3-ol employed in the Williamson Ether Synthesis is itself prepared by a series of reactions beginning with the aniline compound bearing the substituents, corresponding to the substituents desired on the 1-phenyl portion of the resulting indazol-3-ol. This aniline compound is acetylated, e.g., with acetic anhydride. The resulting acetanilide is arylated using bromobenzene bearing the substituents, if any, desired on the benzenoid portion of the indazole end product, potassium carbonate and catalytic amounts of potassium iodide and cuprous bromide in nitrobenzene solvent, to obtain the corresponding substituted N-phenyl acetanilide. Hydrolysis with hydrochloric acid in ethanol yields the disubstituted amine, which is then reacted with an excess of phosgene at −5° to +5° C. to yield the substituted carbamoyl chloride. The reaction of sodium azide with the substituted carbamoyl chloride yields the corresponding carbamoyl azide which is decomposed, rearranged and cyclized in a high-boiling solvent, such as xylene, to yield the disubstituted phenylindazol-3-ol. These reactions can be illustrated for 1-disubstituted phenyl-1H-indazol-3-ol as follows:

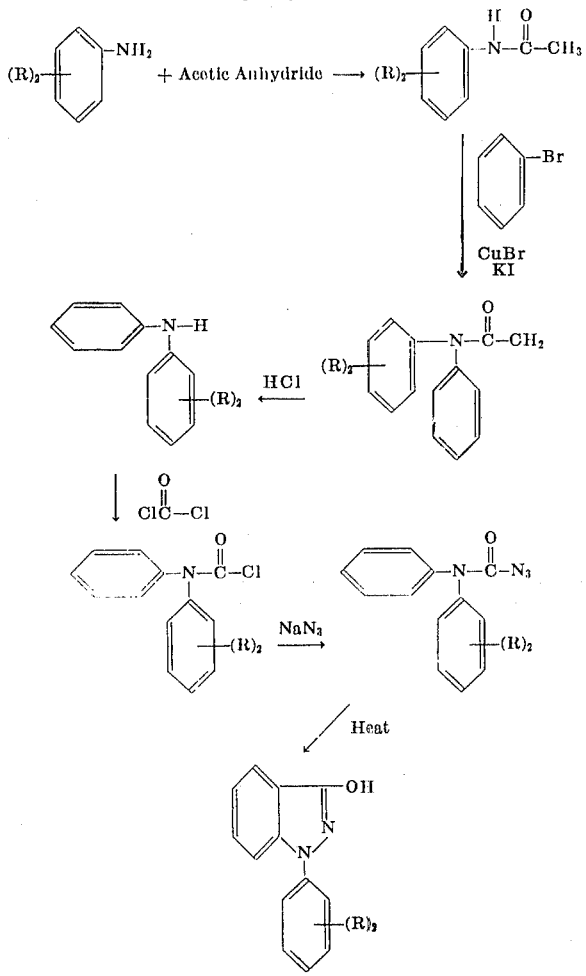

The novel chemical compounds are useful particularly in the field of pharmacology because of their anti-inflammatory activity.

The anti-inflammatory activity of said composition aspect is observed in laboratory animals after inflammation has been induced by subcutaneous injection of carrageenin. Reduction of the induced inflammation is observed when the test animals are treated with the composition aspect of this invention. Such treatment can be accomplished by subcutaneous injection or oral administration or topical administration of the composition aspect of this invention.

The limb volume test for anti-inflammatory activity is employed to test the activity of the composition aspect of this invention. In the procedure employed, male rats averaging 140–160 grams in weight were used. The volume of the left hind foot was measured by a mercury displacement method immediately before and 24 hours after a subplantar injection of 0.1 ml. of a 1 percent suspension of carrageenin in water.

Test substances were administered subcutaneously or orally in olive oil in five equal doses. Two doses were given the day prior to and two doses the day of injection of carrageenin, and the final dose was given the day of final limb measurement. Olive oil alone was used as a negative control.

Percent increase in limb volume produced by the carrageenin was calculated for each group. Percent change from control was also calculated for all treatment groups. A reduction in the increase in limb volume in animals given a test compound evidences an active response.

Food consumption and body weight were recorded for all groups as indices of systemic toxicity.

The foregoing discussion is offered to illustrate methods suitable for the practice of our invention and not to limit its scope. The invention is further illustrated by the following preparations and examples.

The following steps are employed in the preparation of substituted 1-phenyl indazol-3-ol compounds used as precursors for the compounds of this invention.

Preparation 1: 1-[3,5-bis(trifluoromethyl)phenyl]-1H-indazol-3-ol.

Step 1: 3',5'-Bis(trifluoromethyl)acetanilide

Two hundred grams of 3,5-bis(trifluoromethyl)aniline was dissolved in 300 ml. of dry benzene and 102 g. of acetic anhydride was added during a period of 1 hour with stirring. The reaction mixture was refluxed for 1 hour and allowed to cool to room temperature. It was then diluted with 300 ml. of pentane and the 3',5'-bis(trifluoromethyl) acetanilide was filtered off as white crystals melting at about 150°–152° C.

Step 2: N-Phenyl-3',5'-bis(trifluoromethyl)acetanilide

Two hundred thirty grams of 3',5'-bis(trifluoromethyl)acetanilide, 167 g. bromobenzene, 210 g. potassium carbonate, and 4 g. each of potassium iodide and cuprous bromide was placed in 600 ml. of nitrobenzene. The well-stirred mixture was heated to 170°–200° C. for 28 hours. The nitrobenzene was steam distilled from the reaction mixture and the residue, after cooling to room temperature, was partitioned in ether-water. The ether layer was washed with water, the ether was removed under reduced pressure, and the oily residue was crystallized from pentane to give N-phenyl-3',5'-bis(trifluoromethyl)acetonilide, white crystals, melting at about 79°–80° C.

Step 3: 3,5-Bis(trifluoromethyl)diphenylamine

Two hundred forty grams of N-phenyl-3',5'-bis(trifluoromethyl) acetanilide was dissolved in a mixture of 300 ml. of ethanol and 300 ml. of concentrated hydrochloric acid. The reaction mixture was refluxed for 3 hours. The alcohol was removed under reduced pressure, the residue diluted with 2 liters of water and extracted three times with ether. The combined ether fractions were washed with water and the ether boiled off. The oily residue was crystallized from pentane to give 3,5-bis(trifluoromethyl)diphenylamine, white crystals, melting at about 81°–82° C.

Step 4: 3,5-Bis(trifluoromethyl)diphenylcarbamoyl chloride

Ninety grams of phosgene was trapped in 300 mol. of chloroform at −10° C. and to this stirred solution was added a solution of 200 g. of 3,5-bis(trifluoromethyl)diphenylamine and 80 g. of pyridine in 200 ml. of chloroform over a period of 1 hour. The temperature of the reaction mixture was kept at −5° to +5° C. during the addition, then allowed to warm to room temperature, where it was stirred for 1 hour and refluxed for 2 hours, cooled and poured on ice. The chloroform layer was washed repeatedly with water. The chloroform was removed under reduced pressure and the residual solid was suspended in pentane and filtered to give 3,5-bis(trifluoromethyl)diphenylcarbamoyl chloride, white crystals, melting at about 77°–78° C.

Step 5: 3,5-Bis(trifluoromethyl)diphenylcarbamoyl azide

Two hundred grams of 3,5-bis(trifluoromethyl)diphenylcarbamoyl chloride was dissolved in 500 ml. of acetone, stirred and warmed to reflux. Fifty grams of sodium azide in 200 ml. of water was added over a period of 1 hour. The acetone was removed under reduced pressure and the cooled reaction mixture extracted twice with 500 ml. portions of ether. The ether was removed under reduced pressure and the residue crystallized from pentane to give 3,5-trifluoromethyl)diphenylcarbamoyl azide, white crystals, melting at about 79°–81° C.

Step 6: 1-[3,5-Bis(trifluoromethyl)phenyl]-1H-indazol-3-ol

To 1500 ml. of p-xylene heated to reflux was added a solution of 200 g. of 3,5-bis(trifluromethyl)diphenylcarbamoyl azide in 500 ml. of p-xylene over a period of three hours. The reaction mixture was refluxed for an additional 2 hours during which 1.5 liter of the solvent was allowed to boil off. The residue was cooled, filtered and recrystallized from hot ethanol to give 1-[3,5-bis(trifluormethyl)phenyl]-1H-indazol-3-ol, white crystals, melting at about 224°–226° C.

Preparation 2: 1-[2-chloro-5-trifluoromethylphenyl]-1H-indazol-3-ol.

By means of the 6-step procedure described in preparation 1, 1-[2-chloro-5-trifluoromethylphenyl]-1H-indazol-3-ol melting at 191°–3° C. is prepared.

The 1-benzyl-1H-indazol-3-ols are prepared by a different process than that employed for 1-phenyl-1H-indazol-3-ols. The benzyl halide, bearing any desired substituents on the benzyl ring, is caused to react with the reaction mixture resulting from the reaction of an alkali metal alkoxide and indazolone. The corresponding 1-benzyl-1H-indazol-3-ol is obtained upon working up the reaction mixture.

Substituted benzyl halides are prepared by conventional reactions, e.g., reaction of a substituted phenyl bromide with magnesium to form a Grignard reagent which in turn is reacted with formaldehyde to form a substituted benzyl alcohol; benzyl alcohol is converted to the benzyl halide by reaction with concentrated halo acids, e.g., hydrochloric acid and hydrobromic acid. These reactions are shown in the following preparation.

Preparation 3: 1-[3,5-Bis(trifluoromethyl)benzyl]-1H-indazol-3-ol

Eight grams of magnesium were covered with dry diethyl ether and a solution of 100 g. of 3,5-bis(trifluoromethyl)bromobenzene in 400 ml. of dry diethyl ether was added at a rate to maintain reflux of the solvent. After the addition was complete, the reaction mixture was warmed and refluxed for 1 additional hour. By the procedure described in Organic Syntheses Vol. 1, page 188, formaldehyde obtained from 30 g. of paraformaldehyde was added to the Grignard reagent. The reaction mixture was poured onto ice containing hydrochloric acid and the ethereal solution washed several times with water. The organic layer was dried over magnesium sulfate, filtered, the solvent was boiled off and the residue distilled under reduced pressure to give the desired 3,5-bis(trifluoromethyl)benzyl alcohol, melting at about 44°–45° C. (boiling at 100° C. at 14mm. pressure).

To 55 g. of 3,5-bis(trifluoromethyl)benzyl alcohol was added 200 ml. 48 percent hydrobromic acid and 20 ml. concentrated sulfuric acid. After refluxing for 6 hours, the layers were separated and the aqueous layer was repeatedly extracted with ether. The combined ether extracts were added to the organic layer, washed with water, dried over magnesium sulfate, filtered, and the solvent was boiled off. The residue was distilled under reduced pressure, to give the desired 3,5-bis(trifluoromethyl)benzyl bromide, boiling at 136°–140° C./14mm., $n^{26}$ 1.4440.

Forty grams of indazolone and 16.2 g. sodium methoxide was warmed to reflux in 400 ml. ethanol. To this suspension was added 65 g. of 3,5-bis(trifluoromethyl)benzyl bromide over a period of 2 hours; refluxing was continued for 1 additional hour and the mixture was concentrated to 100 ml. It was diluted with water, made acidic with 10 percent hydrochloric acid, filtered, and the produce crystallized from isopropanol to give 1-[3,5-bis(trifluoromethyl)benzyl]-1H-indazol-3-ol, melting at about 190°–191° C.

*Analysis.*—Calculated for: $C_{16}H_{10}F_6N_2O$: C, 53.36; H, 2.80; N, 7.78. Found: C, 53.09; H, 3.05; N, 7.66.

In the following examples in which the results from the limb volume test for anti-inflammatory activity are included, the results were reported as follows:

SQ—Dosage in milligrams per rat injected subcutaneously
a.—Oral dosage in milligrams per rat. Rats used in these tests averaged 150 grams
b.—Oral dosage in milligrams per kilogram of rat body weight
Percent Change—The percentage change from the control as measured by the limb volume test.

Example 1: [1-(3,5-bis[trifluormethyl]phrnyl)-1H-indazol-3-yloxy]-acetic acid.

Seventeen grams of 1-[3,5-bis(trifluormethyl)phenyl]-1H-indazol-3-ol and 3 grams of sodium methoxide were stirred in a mixture of 200 ml. of acetonitrile and 50 ml. of ethanol, heated to reflux. Nine grams of ethyl bromoacetate were added in 1 hour and the refluxing continued for 2 hours. The hot reaction mixture was filtered, the solvent was removed under reduced pressure, and the residue taken up in 150 ml. of hot ethanol, from which 14 grams crude material was obtained. It was repeatedly crystallized from ethanol to give the desired product, ethyl{1-[3,5-bis(trifluoromethyl)phenyl]-1H-indazol-3-yloxy}acetate, white crystals, melting at about 105°–106° C.

Twelve grams of ethyl [1-3,5-bis[trifluormethyl]phenyl)-1H-indazol-3-xyloxy]acetate was dissolved in 200 ml. of hot methanol and at about 50° C. over a period of 10 minutes, 25 ml. of a 5 percent sodium hydroxide solution was added. The methanol was removed under reduced pressure, the residue was cooled and acidified with 55 ml. of 2.5 percent hydrochloric acid and filtered. The crude material was repeatedly crystallized from ethanol to give the desired [1-(3,5-bis[trifluoromethyl]d0phenyl-1H-indazol-3-yloxy]acetic acid, white crystals, melting at about 193°–195° C.

*Analysis.*—Calculated for $C_{17}H_{10}F_6N_2O_3$: C, 50.51; H, 2.50; N, 6.93. Found: C, 50.69; H, 2.49; N, 6.77.

LIMB VOLUME TEST:

| Dosage | Percent change from control |
|---|---|
| 5 (SQ) | 37.3 |
| 60(b) | 65.1 |
| 20(b) | 38.2, 28.6 |
| 6.7(b) | 16.1 |

Example 2: [1-(2-chloro-5-trifluormethylphenyl)-1H-indazol-3-yloxy]-acetic acid.

The procedure of example 1 is followed using 1-(2-chloro-5-trifluoromethylphenyl)-1H-indazol-3-ol in place of 1-[3,5-bis(trifluoromethyl)phenyl]fq1H-indazol-3-ol. The melting point of the ester is observed to be 105°–106° C. Following the procedure the desired [1-(2-chloro-5-trifluormethylphenyl)-1H-indazol-3-yloxy]acetic acid was obtained as a yellowish solid melting at about 134°–136° C.

*Analysis.*—Calculated for $C_{16}H_{10}ClF_3N_2O_3$: C, 51.84; H, 2.72; N, 7.56. Found: C, 51.97; H, 2.65; N, 7.78.

LIMB VOLUME TEST:

| Dosage | Percent change from control |
|---|---|
| 5 (SQ) | 36.9 |
| 20(b) | 41.2 |
| 40(b) | 25.0 |
| 60(b) | 52.7 |

Example 3: (1-[3,5-bis(trifluormethyl)benzyl]-1H-indazol-3-yloxy)-acetic acid.

By the procedure of example 1, using 1-[3,5-bis(trifluoromethyl)benzyl]f-1H-indazol-3-ol in place of 1[3,5-bis(trifluoromethyl)phenyl]f-1H-indazol-3-ol, ethyl {1-[3,5-bis(trifluoromethyl)benzyl]f-1H-indazol-3-yloxy}-acetate was obtained, melting at about 98°–99° C.

*Analysis.*—Calculated for $C_{20}H_{16}F_6N_2O_3$: C, 53.82; H, 3.61; N, 6.28. Found: C, 53.66; H, 3.40; N, 6.37.

This ester was hydrolized following example 1 to yield the desired (1-[3,5-bis(trifluoromethyl)benzyl]-1H-indazol-3-yloxy)acetic acid, melting at about 137°–139° C.

*Analysis.*—Calculated for $C_{18}H_{12}F_6N_2O_3$: C, 51.68; H, 2.89; N, 6.70. Found: C, 51.29; H, 2.78; N, 6.88.

LIMB VOLUME TEST

| Dosage | Percent change from control |
|---|---|
| 40(b) | 1.6 |
| 120(b) | 26.2 |

What is claimed is:

1. A compound of the formula:

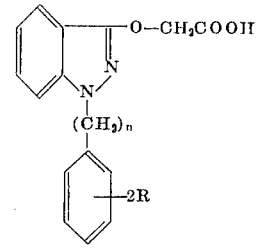

wherein $n$ is 0 or 1 and 2R are two substituents selected from the group consisting of bis-trifluoromethyl and 2-chloro-5-trifluoromethyl.

2. A compound of claim 1 wherein $n$ is 0.
3. A compound of claim 1 wherein $n$ is 1.
4. A compound of claim 1, [1-(3,5-bis[trifluoromethy]phenyl)-1H-indazol-3-yloxy]-acetic acid.
5. A compound of claim 1, [1-(2-chloro-5-trifluoromethylphenyl)-1H-indazol-3-yloxy]-acetic acid.
6. A compound of claim 1, (1-[3,5-bis-(trifluormethyl)-benzyl]-1H-indazol-3-yloxy)-acetic acid.

* * * * *